United States Patent
Irle et al.

(10) Patent No.: US 10,730,997 B2
(45) Date of Patent: Aug. 4, 2020

(54) TDI BASED POLYISOCYANATE MIXTURE WITH A HIGH SOLIDS CONTENT

(71) Applicant: COVESTRO DEUTSCHLAND AG, Leverkusen (DE)

(72) Inventors: Christoph Irle, Köln (DE); Stefan Groth, Leverkusen (DE); Ruiwen Wu, Leverkusen (DE); Antonio Midolo, Köln (DE); Robert Maleika, Dusseldorf (DE); Hongchao Li, Shanghai (CN); Hao Liu, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/344,972

(22) PCT Filed: Oct. 18, 2017

(86) PCT No.: PCT/EP2017/076607
§ 371 (c)(1),
(2) Date: Apr. 25, 2019

(87) PCT Pub. No.: WO2018/077694
PCT Pub. Date: May 3, 2018

(65) Prior Publication Data
US 2019/0270843 A1 Sep. 5, 2019

(30) Foreign Application Priority Data
Oct. 26, 2016 (WO) ............... PCT/CN2016/103356

(51) Int. Cl.
| | |
|---|---|
| *C08G 18/79* | (2006.01) |
| *C08G 18/18* | (2006.01) |
| *C08G 18/32* | (2006.01) |
| *C08G 18/42* | (2006.01) |
| *C08G 18/80* | (2006.01) |
| *C08G 18/09* | (2006.01) |
| *C08G 18/72* | (2006.01) |
| *C08G 18/02* | (2006.01) |
| *C09D 175/04* | (2006.01) |
| *C09D 175/06* | (2006.01) |

(52) U.S. Cl.
CPC ......... *C08G 18/794* (2013.01); *C08G 18/022* (2013.01); *C08G 18/092* (2013.01); *C08G 18/1816* (2013.01); *C08G 18/3206* (2013.01); *C08G 18/4288* (2013.01); *C08G 18/721* (2013.01); *C08G 18/8019* (2013.01); *C08G 18/8029* (2013.01); *C09D 175/04* (2013.01); *C09D 175/06* (2013.01)

(58) Field of Classification Search
CPC .............. C08G 18/794; C08G 18/8019; C08G 18/8029; C08G 18/1816; C08G 18/4288; C08G 18/3206; C08G 18/721; C08G 18/022; C08G 18/092; C09D 175/06; C09D 175/04

See application file for complete search history.

(56) References Cited

U.S. PATENT DOCUMENTS

| | | | |
|---|---|---|---|
| 4,255,569 A | 3/1981 | Müller et al. | |
| 6,936,678 B2 * | 8/2005 | Brahm | ................ C08G 18/022 528/53 |
| 2010/0099816 A1 | 4/2010 | Wamprecht et al. | |

* cited by examiner

*Primary Examiner* — Rabon A Sergent
(74) *Attorney, Agent, or Firm* — John E. Mrozinski, Jr.

(57) ABSTRACT

The invention relates to a polyisocyanate mixture comprising at least one polyisocyanurate which is based on tolylene diisocyanate and has isocyanate groups and at least one polyurethane which is based on tolylene diisocyanate and has isocyanate groups, wherein the polyisocyanate mixture has
a) a solids content of from ≥51 to ≤90% by weight, based on the total weight of the polyisocyanate mixture and
b) a content of monomeric tolylene diisocyanate of ≤0.9% by weight, based on the total weight of the polyisocyanate mixture, and
the polyisocyanurate which is based on tolylene diisocyanate and has isocyanate groups has a polydispersity D of from ≥1 to ≤1.5, based on the total weight of the polyisocyanurate which is based on tolylene diisocyanate and has isocyanate groups, where the polydispersity D is the ratio of weight average and number average molecular weight of the polyisocyanurate and the weight average and number average molecular weight is in each case determined by means of gel permeation chromatography using a polystyrene standard and tetrahydrofuran as eluent in accordance with DIN 55672-1:2016-03.

26 Claims, No Drawings

TDI BASED POLYISOCYANATE MIXTURE WITH A HIGH SOLIDS CONTENT

CROSS REFERENCE TO RELATED APPLICATIONS

This application is the U.S. National Phase application under 35 U.S.C. § 371 of International Application No. PCT/EP2017/076607 filed Oct. 18, 2017, which claims priority to PCT/CN2016/103356 filed Oct. 26, 2016, the disclosures of both applications are incorporated herein by reference.

FIELD OF THE INVENTION

The present invention relates to a polyisocyanate mixture comprising at least one polyisocyanurate which is based on tolylene diisocyanate and has isocyanate groups and at least one polyurethane which is based on tolylene diisocyanate and has isocyanate groups. The invention additionally relates to a process for producing the polyisocyanate mixture and the use of the polyisocyanate mixture. Furthermore, the present invention relates to a two-component system containing the polyisocyanate mixture and a process for producing a composite system. The composite system or coated substrate obtainable by this process is likewise provided by the invention.

BACKGROUND OF THE INVENTION

Polyisocyanates based on tolylene diisocyanate (TDI) are used commercially for surface coatings and adhesives as crosslinkers in 2-component polyurethane systems. Their purpose is to effect chemical crosslinking of isocyanate-reactive components, e.g. polyols, and curing to give a chemicals-resistant and mechanically strong film. Mixtures of urethanized adducts and isocyanurates of TDI are often used for this purpose.

Isocyanurates of TDI are prepared by cyclotrimerization using various catalysts. Reaction products of this type have been known for a long time and are described, for example, in DE 951168 B, DE 1013869 A, U.S. Pat. No. 6,936,678 B2, DE 19523657 A1, U.S. Pat. No. 4,255,569 A, EP 2174967 B1 and CN 105001701.

There has long been a desire to prepare the known isocyanurates of TDI firstly with a low viscosity and secondly with a high functionality.

A low viscosity is desired, for example, in order to improve the application behaviour of surface coatings and adhesives. In addition, use of low-viscosity polyisocyanates as crosslinkers of surface coatings and adhesives enables the solvent content of the formulation to be reduced. This means that the emissions of volatile organic compounds from such formulations can be reduced without having an adverse effect on the usability.

Furthermore, it is desirable when using such polyisocyanates as crosslinkers in surface coatings and adhesives for the polyisocyanates to have a high content of isocyanate groups. This further increases the sustainability in the sense of a low content of organic solvents and rapid crosslinking, i.e. high process efficiency.

In addition, it is desirable for the isocyanurates of TDI to have a low content of free diisocyanate. Owing to the toxicological concerns about monomeric TDI, this is an important condition for universal usability in industrially applied surface coatings and adhesives.

The reaction of TDI to form the polyisocyanurate gives, as is known, for example, from DE 951168 B and DE 1013869 A, very highly viscous resins, which makes processing more difficult or makes it necessary to use larger amounts of organic solvents. In addition, polyisocyanates of TDI have a high tendency to crystallize and are only sparingly soluble in organic solvents.

Owing to the high viscosity, even at high temperatures, it is, according to the prior art, not possible to free such resins of monomeric TDI easily by distillation. U.S. Pat. No. 4,255,569 A, EP 2174967 B1 and CN 105001701 describe various ways of carrying out a work-up by distillation in order to reduce the content of monomeric TDI by chemical modification or the addition of distillation auxiliaries. Since such additives reduce the content of functional groups (calculated as proportion by weight of isocyanate groups (NCO groups) based on the total weight of the composition), this is undesirable in principle.

SUMMARY OF THE INVENTION

Carrying out the reaction of TDI to form the polyisocyanurate in organic solution has also been described and known for some time, as described, for example, in U.S. Pat. No. 6,936,678 B2, DE 19523657 A1. However, the resins obtained in this way are present in greatly diluted solution and thus lead to high emission of organic solvents during and after application as surface coating or adhesive.

DETAILED DESCRIPTION OF THE INVENTION

Proceeding from this prior art, it was an object of the present invention to alleviate at least one, preferably more than one, of the abovementioned disadvantages of the prior art. In particular, it was an object of the present invention to provide polyisocyanate mixtures which are based on TDI and which have a high content of free isocyanate groups, and at the same time a low content of monomeric diisocyanates and have a low viscosity in dissolved form.

This object is achieved by a polyisocyanate mixture comprising at least one polyisocyanurate which is based on tolylene diisocyanate and has isocyanate groups and at least one polyurethane which is based on tolylene diisocyanate and has isocyanate groups, wherein the polyisocyanate mixture has a) a solids content of from ≥51 to ≤90% by weight, based on the total weight of the polyisocyanate mixture, b) a content of monomeric tolylene diisocyanate of ≤0.9% by weight, based on the total weight of the polyisocyanate mixture, and the polyisocyanurate which is based on tolylene diisocyanate and has isocyanate groups has a polydispersity D of from ≥1 to ≤1.5, based on the total weight of the polyisocyanurate which is based on tolylene diisocyanate and has isocyanate groups, where the polydispersity D is the ratio of weight average and number average molecular weight of the polyisocyanurate and the weight average and number average molecular weight is in each case determined by means of gel permeation chromatography using a polystyrene standard and tetrahydrofuran as eluent in accordance with DIN 55672-1:2016-03.

An increased content of isocyanate groups compared to the prior art can be achieved by the polyisocyanate mixture of the invention. In addition, this polyisocyanate makes possible a low viscosity in solutions, so that a higher solids content can be realised and, in addition, the emission of volatile organic solvents can be reduced further. It has surprisingly been found that the already high solids content which can be achieved by means of the abovementioned polyisocyanurates containing isocyanate groups can be increased further by blending with polyurethane resins containing isocyanate groups, always giving mixtures which still have a low viscosity.

For the purposes of the present invention, the term tolylene diisocyanate (TDI) is used as collective term for the isomers tolylene 2,4-diisocyanate, tolylene 2,6-diisocyanate and any mixtures of tolylene 2,4- and 2,6-diisocyanate.

For the purposes of the present invention, the expression "based on tolylene diisocyanate" means that tolylene diisocyanate makes up ≥60% by weight, preferably ≥90% by weight, particularly preferably ≥95% by weight and very particularly preferably 100% by weight, of the total compounds bearing isocyanate groups which are used. Furthermore, preference is given to the tolylene diisocyanate being a mixture of tolylene 2,4-diisocyanate and tolylene 2,6-diisocyanate which are present in a weight ratio to one another of from 3:2 to 9.5:0.5 and preferably from 7:3 to 9:1. This gives the further advantage that an appropriate balance between selectivity of the differently reactive isocyanate groups in the 2,4-TDI and an increase in the crystallization stability resulting from at least a small proportion of 2,6-TD.

The balance to 100% by weight can consist of any other compounds having isocyanate groups, for example monoisocyanates having aliphatically, cycloaliphatically, araliphatically or aromatically bound isocyanate groups, e.g. stearyl isocyanate, naphthyl isocyanate, diisocyanates having aliphatically, cycloaliphatically, araliphatically and/or aromatically bound isocyanate groups, e.g. 1,4-diisocyanatobutane, 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanato-methyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatomethylcyclohexane (IMCI), bis(isocyanatomethyl)norbornane, 2,4'- and 4,4'-diisocyanatodiphenylmethane and higher homologs, 1,5-diisocyanatonaphthalene, dipropylene glycol diisocyanate, triisocyanates and/or higher-functionality isocyanates such as 4-isocyanatomethyloctane 1,8-diisocyanate (nonane triisocyanate), undecane 1,6,11-triisocyanate or any mixtures of such isocyanate compounds and modified isocyanate compounds which are derived from the abovementioned diisocyanates and triisocyanates and are prepared by oligomerization reactions, for example trimerization. Preferred compounds having isocyanate groups are for the present purposes 1,5-diisocyanatopentane (PDI) and/or 1,6-diisocyanatohexane (HDI) and/or modified isocyanate compounds which are derived from the diisocyanates mentioned above as preferred and are prepared by oligomerization reactions, for example trimerization. If compounds mentioned above which have isocyanate groups and are different from TDI are concomitantly used, the total amount of any monomeric monoisocyanates, diisocyanates and triisocyanates still present is ≤0.9% by weight, based on the total weight of the polyisocyanate mixture.

The number average molecular weights Mn mentioned in the present document and the weight average molecular weights Mw mentioned in the present document were determined by means of gel permeation chromatography (GPC) using a polystyrene standard and tetrahydrofuran as eluent in accordance with DIN 55672-1:2016-03.

For the purposes of the invention, the references to "comprising", "containing", etc., preferably mean "consisting essentially of" and very particularly preferably "consisting of".

In a first preferred embodiment, the solids content is from ≥55 to ≤85% by weight, preferably from ≥60 to ≤80% by weight and particularly preferably from ≥65 to ≤75% by weight. This gives the further advantage that the emission of organic solvent may be further reduced without having to be subjected to an extended drying time.

The solids content, in this application also referred to as non volatile content, was determined in accordance with DIN EN ISO 3251 using a drying temperature and time of 2 hours at 120° C. and a test dish diameter of 75 mm and a weighed-in quantity of 2.00 g+/−0.02.

The resulting solids content consists to >90% by weight, preferably to >95% by weight and particularly preferably to >99% by weight of the polyisocyanurates and the polyurethanes according to the invention or their respective decomposition or reaction products.

In a further preferred embodiment, the polydispersity D of the polyisocyanurate which is based on tolylene diisocyanate and has isocyanate groups is from ≥1.0005 to ≤1.3 and preferably from ≥1.005 to ≤1.15. This gives the further advantage that the polyisocyanate has a particularly low viscosity but allows a surprisingly high crosslinking rate.

In a further preferred embodiment, the content of monomeric tolylene diisocyanate is ≤0.5% by weight, preferably ≤0.3% by weight and particularly preferably ≤0.1% by weight, based on the total weight of the polyisocyanate mixture. This gives the further advantage that the polyisocyanate mixture of the invention can be used in an even broader range of applications since occupational hygiene, in particular in manual applications, is improved still further. If compounds which have isocyanate groups and are different from TDI are concomitantly used, the total amount of any monomeric monoisocyanates, diisocyanates and triisocyanates, including TDI, still present is ≤0.5% by weight, preferably ≤0.3% by weight and particularly preferably ≤0.1% by weight, based on the total weight of the polyisocyanate mixture of the invention. The content of monomeric tolylene diisocyanate and the total amount of any monomeric monoisocyanates, diisocyanates and triisocyanates, including TDI, still present are determined gas-chromatographically using an internal standard in accordance with DIN EN ISO 10283:2007-11.

In a further preferred embodiment, the polyisocyanurate which is based on tolylene diisocyanate and has isocyanate groups and the polyurethane which is based on tolylene diisocyanate and has isocyanate groups are present in a weight ratio to one another of from 2.5:1 to 1:2.5, preferably from 2.0:1 to 1:1.5, in the polyisocyanate mixture of the invention. In addition, particular preference is given to the solids content in the polyisocyanate mixture of the invention being made up to an extent of ≥60% by weight, preferably ≥85% by weight, particularly preferably ≥95% by weight and very particularly preferably 100% by weight, of the polyisocyanurate which is based on tolylene diisocyanate and has isocyanate groups and the polyurethane which is based on tolylene diisocyanate and has isocyanate groups.

In a further preferred embodiment, the polyisocyanate mixture of the invention has a viscosity of from ≥300 to <2000 mPas at 23° C. and preferably from ≥500 to <1500 measured in accordance with DIN EN ISO 3219:1994-10 using a cone/plate measuring instrument.

In a further preferred embodiment, the polyisocyanate mixture of the invention has a content of isocyanate groups of from ≥11.0 to ≤20.0% by weight, preferably from ≥12.0 to ≤18.0% by weight and particularly preferably from ≥14.0 to ≤16.0% by weight, based on the total weight of the polyisocyanate mixture. The content of isocyanate groups is determined titrimetrically in accordance with DIN EN ISO 11909:2007-05.

In a further preferred embodiment, the polyisocyanurate which is based on tolylene diisocyanate and has isocyanate groups has a content of allophanate and urethane groups of from ≥0 to ≤0.5% by weight, preferably from ≥0% by weight to ≤0.1% by weight and particularly preferably from ≥0 to ≤0.05% by weight, based on the total weight of the polyisocyanurate. This leads to the further advantage that the crosslinking density is improved since no isocyanate groups have been reacted with hydroxyl groups and would then no longer be available for crosslinking in the final use. This effect is particularly pronounced in the case of allophanate groups since a hydroxyl group is in this case reacted with a total of two isocyanate groups. Urethane groups can under some conditions tend to undergo transurethanization, which can lead to an undesirable shift in the molecular weight distribution. The content of allophanate and urethane groups is determined by NMR spectroscopic analysis of the polyisocyanate, preferably by $^{13}$C-NMR spectroscopy.

For the present purposes, allophanate groups are the following structural units:

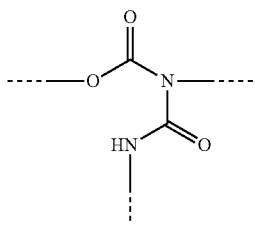

allophanate group ($C_2HN_2O_3$)

For the present purposes, urethane groups are the following structural units:

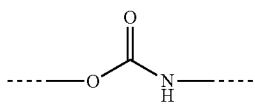

urethane group ($CHNO_2$)

In principle, the polyisocyanate mixture of the invention can be produced by mixing the at least one polyisocyanurate which is based on tolylene diisocyanate and has isocyanate groups with the polyurethane which is based on tolylene diisocyanate and has isocyanate groups, where the polyisocyanurate which is based on tolylene diisocyanate and has isocyanate groups and/or the polyurethane which is based on tolylene diisocyanate and has isocyanate groups are/is present in an organic solvent which is inert towards isocyanate groups.

The present invention further provides a process for preparing the polyisocyanate mixture according to the invention comprising the steps (i) reaction of tolylene diisocyanate to form isocyanurate groups in the presence of at least one catalyst,
(ii) stopping of the reaction at a content of isocyanate groups of from ≥30 to ≤48.3% by weight, preferably from ≥34 to ≤46% by weight and particularly preferably from ≥38 to ≤42% by weight by deactivation of the catalyst, preferably by thermal decomposition of the catalyst or by addition of at least one catalyst poison, and particularly preferably by addition of at least one catalyst poison and
(iii) removal of the unreacted tolylene diisocyanate,
(iv) addition of at least one organic solvent which is inert towards isocyanate groups and
(v) addition of the at least one polyurethane which is based on tolylene diisocyanate and has isocyanate groups and is optionally diluted in at least one solvent and optionally further auxiliaries and additives, where the steps (iv) and (v) can be carried out in any order or simultaneously, with step (v) preferably being carried out after step (iv).

The invention therefore likewise provides a process for producing the polyisocyanate mixture of the invention, in which at least one polyisocyanurate which is based on tolylene diisocyanate and has isocyanate groups and has a polydispersity D of from >1 to ≤1.5, based on the total weight of the polyisocyanurate which is based on tolylene diisocyanate and has isocyanate groups, and is dissolved in at least one organic solvent which is inert towards isocyanate groups, where the polydispersity D is the ratio of the weight average molecular weight and number average molecular weight of the polyisocyanurate and the weight average molecular weight and the number average molecular weight are in each case determined by means of gel permeation chromatography using a polystyrene standard and tetrahydrofuran as eluent in accordance with DIN 55672-1:2016-03, is mixed with at least one polyurethane which is based on tolylene diisocyanate and has isocyanate groups and is optionally diluted in at least one solvent and optionally further auxiliaries and additives.

In a further preferred embodiment, the steps (i) to (iii) are carried out in the presence of from ≥0 to <1% by weight of liquid distillation auxiliaries which are inert under distillation conditions and have a boiling point at least 50° C. above that of the isocyanurate group-free monomeric isocyanate and/or from ≥0 to <1% by weight, based on the total weight of the compounds used in step (i) and (ii), of compounds which have one or more hydroxyl groups. If various monomeric isocyanates are used, the 50° C. relates to the boiling point of the isocyanate used which has the highest boiling point. The content of isocyanate groups is determined as indicated above.

Preference is given to such distillation auxiliaries being present in amounts of from ≥0 to ≤0.5% by weight, preferably from ≥0 to ≤0.25% by weight and particularly preferably from ≥0 to ≤0.1% by weight, based on the total weight of the compounds used in step (i) and (ii), and/or the compounds having one or more hydroxyl groups being present in amounts of from ≥0 to ≤0.8% by weight, preferably from ≥0 to ≤0.5% by weight, particularly preferably from ≥0 to ≤0.1% by weight, based on the total weight of the compounds used in step (i) and (ii). Any distillation auxiliaries present in these amounts and/or any compounds having one or more hydroxyl groups which are present in these amounts have no adverse effect on the process of the invention. However, very particular preference is given to no distillation auxiliaries and/or no compounds having one or more hydroxyl groups being present in steps (i) to (iii) of the process of the invention, with the exception of the aromatic hydroxyl groups which are mentioned in the following as catalyst constituent and may optionally be present.

If solvents which are inert towards isocyanate groups are present in steps (i) to (iii) in the process of the invention, preference is given to such solvents being able to be present in steps (i) to (iii) in amounts of from ≥0 to ≤3% by weight, preferably from ≥0 to ≤1% by weight and particularly preferably from ≥0 to ≤0.05% by weight, based on the total weight of the compounds used in step (i) and (ii).

Any above-defined compounds having isocyanate groups which are to be concomitantly used can be added in step (i), with the above-defined minimum % by weight of tolylene diisocyanate also applying here. Particular preference is likewise given to only tolylene diisocyanate being used in step (i).

As catalysts for the formation of isocyanurate groups, hereinafter also referred to as trimerization catalysts, it is in principle possible to use all known catalysts of the prior art, for example phosphines, alkali metal salts, alkali metal alkoxides, tertiary amines, fluorides, hydrogendifluorides or hydrogenpolyfluorides. Preference is given to using catalysts which have N,N-dialkylaminomethyl groups bound to the aromatic and phenolic OH groups (alkyl: independently alkyl chain or alkylene chain having up to 18 carbon atoms, which are optionally separated by oxygen or sulphur). These groups can be distributed over a plurality of molecules or be positioned on one or more benzenic aromatics. Particular preference is given to using catalysts which contain both hydroxyl groups and dialkylaminomethyl groups in one molecule. Very particular preference is given to using catalysts whose dialkylaminomethyl groups (alkyl=$C_1$ to $C_3$ chain) are positioned in the ortho position relative to aromatic hydroxyl groups. As examples, mention may be made of the following Mannich bases which are obtained, for example, on the basis of phenol, p-isononylphenol or bisphenol A, for example by reacting 188 parts by weight of phenol with 720 parts of a 25% strength aqueous dimethylamine solution and 425 parts by weight of 40% strength formaldehyde solution by heating to 80° C. for two hours, separating of the aqueous phases and distilling the organic phase at 90° C./10 torr as described in DE-A 2 452 531 9.

The reaction in step (i) is generally carried out at temperatures in the range from 20 to 120° C., preferably from 40 to 100° C. and particularly preferably from 60 to 90° C.

The catalysts are used in step (i) either as pure substance or as solution, optionally in a plurality of small portions, with the amount being able to be varied over a wide range. The total amount of catalyst used is preferably from ≥0.001 to ≤2.0% by weight, preferably from ≥0.003 to ≤0.5% by weight and particularly preferably from ≥0.005 to ≤0.05% by weight, based on the total weight of the compounds used in step (i) and (ii).

The stopping of the reaction in step (ii) is effected by deactivation of the catalyst. This can be achieved by different methods, preferably by thermal decomposition of the catalyst or by addition of at least one catalyst poison and particularly preferably by addition of at least one catalyst poison, with, for example, sulphur (in the case of the use of phosphines as catalysts) or alkylating agents such as methyl toluenesulphonate (in the case of the preferred use of Mannich bases as catalysts) or else acylating agents such as benzoyl chloride or isophthaloyl dichloride being able to be used as catalyst poisons. Also preferred, acidic esters of phosphoric acid, e.g. dibutyl phosphate are used.

The amount of the catalyst poison to be used is selected according to the amount of catalyst used, so that the catalyst is deactivated. Preference is given to using a total subequimolar amount of the catalyst poison based on equivalents of Lewis bases of the catalysts. From >20 to <200%, based on the equivalents of Lewis base of the catalyst used, can be sufficient for complete deactivation of the catalyst.

The removal of the unreacted tolylene diisocyanate in step (iii) can be carried out by any methods, but is preferably carried out by means of at least one thermal separation process, which can have one or more stages. Suitable thermal separation processes are, for example, distillations under reduced pressure by means of a thin film evaporator and/or falling film evaporator. Pressures in the range of 0.1-20 mbar and temperatures of 140-220° C. are generally suitable for the removal of TDI.

In general, diluents and solvents customary in polyurethane chemistry are used to add the at least one organic solvent which is inert with respect to isocyanate groups in step (iv), for example toluene, xylene, cyclohexane, butyl acetate, ethyl acetate, ethyl glycol acetate, pentyl acetate, hexyl acetate, methoxypropyl acetate, tetrahydrofuran, dioxane, acetone, N-methylpyrrolidone, methyl ethyl ketone, petroleum spirit, relatively highly substituted aromatics as are commercially available, for example, under the name Solvent Naphtha®, Solvesso®, Shellsol®, Isopar®, Nappar® and Diasol®, homologues of benzene, tetralin, decalin and alkanes having more than 6 carbon atoms, conventional plasticizers such as phthalates, sulphonic esters and phosphoric esters and also mixtures of such diluents and solvents.

Further suitable solvents are polyisocyanates based on aliphatic diisocyanates, as are described, for example, in DE-A 4 428 107. This makes it possible to obtain diluted low-monomer TDI trimers which contain no or less volatile solvents and diluents.

The solvent is preferably added in an amount required to be able to set the solids content to from ≥15 to ≤80% by weight, preferably from ≥20 to ≤75% by weight, particularly preferably from ≥25 to ≤73% by weight and very particularly preferably from ≥55 to ≤70% by weight.

The addition in step (v) of the process of the invention of the at least one polyurethane which is based on tolylene diisocyanate and has isocyanate groups and is optionally diluted in at least one solvent and optionally of further auxiliaries and additives leads to a physical mixture of polyisocyanates.

Suitable polyurethanes which are based on tolylene diisocyanate and have isocyanate groups can, for example, be prepared by reaction of tolylene diisocyanate with any hydroxyl-containing compounds in a suitable solvent in a manner known to those skilled in the art.

Suitable auxiliaries and additives are, for example, the customary wetting agents, levelling agents, skin prevention agents, antifoams, solvents, matting agents such as silica, aluminium silicates and high-boiling waxes, viscosity-regulating substances, pigments, dyes, UV absorbers, stabilizers against thermal or oxidative degradation.

The polyisocyanate mixture obtained or obtainable by the above described process is also a part of the invention.

The polyisocyanate mixture of the invention is particularly well suited for use as crosslinker in an adhesive or a coating composition. The two abovementioned uses are therefore likewise part of the invention.

The polyisocyanate mixture of the invention is preferably used for producing adhesives or coating materials which can be cured under the action of moisture. It can likewise be used for the production of bonding agents, printing inks and polyurethane mouldings. They are particularly preferably used as crosslinkers in two-component systems containing compounds which are reactive towards isocyanate groups and are known per se.

The invention therefore further provides a two-component system comprising an isocyanate component A) containing at least one polyisocyanate mixture according to the invention and a component B) which is reactive towards isocyanate groups and contains at least one compound which is reactive towards isocyanate groups, preferably at least one hydroxyl-containing polyester.

Examples of suitable compounds which are reactive towards isocyanate groups are hydroxy-functional polyethers, polyesters, polyamides, polycarbonates, polyacrylates, polybutadienes and mixed types of the hydroxy-functional polymers mentioned. Low molecular weight diols and polyols, dimeric and trimeric fatty alcohols and also amino-functional compounds can also be used in the two-component system according to the invention. In addition, cyclohexanone-formaldehyde condensates, for example in castor oil, are suitable. However, hydroxyl-containing polyesters are particularly preferred. Apart In addition, other auxiliaries and additives such as the customary wetting agents, levelling agents, skin prevention agents, antifoams, bonding agents, solvents, matting agents such as silica, aluminium silicates and high-boiling waxes, viscosity-regulating substances, pigments, dyes, UV absorbers, stabilizers against thermal or oxidative degradation can be used in the coatings or adhesive bonds. The coating compositions can be used in the form of clear varnishes or in the form of pigmented paints.

The coating materials or adhesives obtained can be used for coating or adhesively bonding any substrates such as natural or synthetic fibre materials, preferably wood, plastics, leather, paper, textiles, glass, ceramic, plaster or render, masonry, metals or concrete and particularly preferably paper or leather. They can be applied by conventional application methods such as spraying, painting, flooding, casting, dipping, rolling.

The invention further provides a process for producing a composite system, which comprises a step in which a two-component system according to the invention is applied to at least one substrate and comprises at least one further step in which the two-component system which has been applied to the substrate is cured, optionally under the action of heat.

Here, the substrate is preferably one or more materials selected from the group consisting of metal, plastic, glass, wood, leather, textiles and mixtures thereof, preferably selected from the group consisting of a natural or synthetic fibrous material and mixtures thereof and particularly preferably selected from the group consisting of paper, cork and wood.

The composite system or coated substrate which has been produced or can be produced by the process of the invention is additionally provided by the invention. The composite system of the invention is preferably a piece of furniture, a decorative object, a floor covering, a wooden interior installation or a shoe and the coated substrate of the invention is preferably a piece of furniture, a decorative object, a floor covering or a wooden Interior installation. This results in the advantage that smaller amounts of solvent are required during processing and occupational hygiene can therefore be improved further.

The invention will be illustrated below with the aid of examples and comparative examples, but without being restricted thereto.

EXAMPLES

All percentages are, unless indicated otherwise, by weight.

The determination of the NCO contents was carried out titrimetrically in accordance with DIN EN ISO 11909:2007-05.

The residual monomer contents were determined gas-chromatographically using an internal standard in accordance with DIN EN ISO 10283:2007-11.

All viscosity measurements were carried out in accordance with DIN EN ISO 3219:1994-10 using a cone/plate measuring instrument. Unless indicated otherwise, measurements were carried out at a temperature of 23° C.

The distribution of the oligomers was determined by gel permeation chromatography in accordance with DIN 55672: 2016-03 using polystyrene as standard and tetrahydrofuran as eluent.

The non volatile content was determined in accordance with DIN EN ISO 3251 using a drying temperature and time of 2 hours at 120° C. and a test dish diameter of 75 mm and a weighed-in quantity of 2.00 g+/−0.02.

The drying properties of the coating systems were determined in accordance with DIN 53 150:2002-09.

Polyisocyanate 1

1500 parts of a mixture of tolylene diisocyanate, containing approx. 80% tolylene 2,4-diisocyanate and approx. 20% tolylene 2,6-diisocyanate, were added to a 2 L flask with stirrer equipped with a reflux condenser, dropping funnel and nitrogen inlet. The mixture was heated to 80° C. Then, 0.52 parts, by weight, of a Mannich base catalyst (bisphenol A/formaldehyde/dimethylamine, 25% in n-butyl acetate/xylene 19:56) were added in two hours. As soon as the free isocyanate group content was 40.4%, 1.0 part, by weight, of dibutyl phosphate was added to stop the reaction.

The excess monomeric isocyanate was then removed by a combination of short path distillation and thin-film evaporator at a pressure of 0.05 mbar and a temperature of 180° C. (short path distillation) and consecutively 180° C. (thin film evaporator). 370 parts of a solid transparent product with glassy consistency were obtained after the distillation. The resin isolated contained 0.18%, by weight, of free monomeric tolylene diisocyanate and 78.9%, by weight, of tris-(isocyanatotoluene)-isocyanurate, a number average of molecular weight of 533 g/mol and a polydispersity D of 1.09.

The resin was dissolved in ethyl acetate to get a solution with the following characteristics:

Isocyanate group content: 15.1%

Non volatile content: 64.6%

Viscosity: 291 mPas

Polyisocyanate 2

1700 parts of a mixture of tolyluene diisocyanate, containing approx. 80% tolylene 2,4-diisocyanate and approx. 20% tolylene 2,6-diisocyanate, were added to a 2 L flask with stirrer equipped with a reflux condenser, dropping funnel and nitrogen inlet. The mixture was heated to 85° C. Then, 170 parts, by weight, of polyol (1,1,1-Tris(hydroxymethyl) propane/diethylene glycol=65:35) were added in 49 minutes. After 55 minutes, the free isocyanate group content reached 35.9%, indicating full conversion of the isocyanate-polyol reaction.

Excess monomeric isocyanate was then removed by distillation at a pressure of 0.01 mbar, using a short path evaporator (132° C.) and consecutively, a thin film evaporator (127° C.). 735 parts of solid transparent product with glassy consistency was obtained. The isolated resin had a number average molecular weight of 750 g/mol and a polydispersity D of 1.14. It contained 0.20% of free monomeric tolylene diisocyanate.

The resin was dissolved in ethyl acetate to a solution with the following characteristics:
Isocyanate group content: 14.1%
Non volatile content: 74.4%
Viscosity: 772 mPas
Polyisocyanate 3

1575 parts of a mixture of tolylene diisocyanate, containing approx. 80% tolylene 2,4-diisocyanate and approx. 20%/tolylene 2,6-diisocyanate and 750 parts, by weight, of butyl acetate, were added to a 4 L flask with stirrer equipped with a reflux condenser, dropping funnel and nitrogen inlet. The mixture was heated to 88° C. Then, 168 parts, by weight, of 1-dodecanol, were added in 55 minutes. As soon as the mixture reached a content of free NCO groups of 28.97% (weight), 1055 parts of butyl acetate were added. Temperature was decreased to 45° C. Then, 17 parts, by weight, of a Mannich base catalyst (bisphenol A/formaldehyde/dimethylamine, 25% in n-butyl acetate/xylene 19:56) were added during 23.5 hours. When the NCO group content had reached 7.56%, 10.6 parts, by weight, of methyl p-toluenesulfonate were added to stop the reaction.

The resin isolated contained 13.23%, by weight, of tris-(isocyanatotoluene)-isocyanurate and had a molecular weight (number average) of 1160 g/mol at a polydispersity D of 1.62.

The resin was dissolved in ethyl acetate to get a solution with the following characteristics:
Isocyanate group content: 7.6%
Non volatile content: 49.8%
Viscosity: 164 mPas

Example 1

For performance testings, Desmophen 1300 X (Covestro), a fatty acid modified polyester polyol with OH content of 3.2%, by weight, and a non volatile content of approx. 75%, was used as a coreactant. The ratio of isocyanate groups to hydroxyl groups was 0.8 and the solid content of the final formulation at application was 40%, by weight.

Formulation 1 (Inventive)

| Ingredient | Weight % |
|---|---|
| Blend of Polyisocyanate 1 and Polyisocyanate 2 (7.5:3, by weight) | 20.3 |
| Desmophen 1300 X | 46.0 |
| Butyl Acetate | 33.7 |

Formulation 2 (Comparison)

| Ingredient | Weight % |
|---|---|
| Blend of Polyisocyanate 3 and Polyisocyanate 2 (16:5, by weight) | 27.6 |
| Desmophen 1300 X | 38.6 |
| Butyl Acetate | 33.8 |

TABLE 1

Viscosity, solids content and drying times of Formulations 1 and 2

| Formulation | Viscosity (T4 cup/ 23° C.) | Solids content (%) | T1 | T3 | T4 |
|---|---|---|---|---|---|
| 1 | 15.5 s | 48.2 | 11 min 1 s | 44 min 2 s | 56 min |
| 2 | 15.8 s | 44.4 | 10 min 7 s | 25 min 26 s | 36 min 3 s |

Pendulum Hardness (Koenig):

TABLE 2

Pendulum Hardness (Koenig) of Formulations 1 and 2

| Formulation | 2 d | 4 d | 7 d |
|---|---|---|---|
| 1 | 170 s | 177 s | 173 s |
| 2 | 160 s | 165 s | 177 s |

Solvent-Resistance Testing

A film was prepared as described above and dried for seven days. Then, a cotton ball, wetted by the solvent, was placed on the surface of the coating. Status of the film was observed after different times, as shown in table 3.

TABLE 3

Solvent-resistance of Formulations 1 and 2

| | Acetone | | | Butyl Acetate | | | Xylene | | | Ethanol | | |
|---|---|---|---|---|---|---|---|---|---|---|---|---|
| Formulation | 1 min | 3 min | 5 min | 1 min | 3 min | 5 min | 1 min | 3 min | 5 min | 1 min | 3 min | 5 min |
| 1 | | | 5 | 1 | 1 | 2 | 0 | 0 | 0 | 1 | 1 | 2 |
| 2 | | | 5 | 1 | 1 | 2 | 0 | 0 | 0 | 1 | 1 | 2 |

0: No traces, film complete/
1-4: Increasing damage of the film/
5: Film destroyed Ingredients were mixed together homogenously, as summarized for Formulation 1, 2 and 3. Then the mixture was immediately applied onto transparent glass using a film applicator (thickness of wet film 120 μm) and was allowed to dry at ambient temperature (23.5° C.) and a humidity of 50%. Testings were based on the DIN 53 150:2002-09.

The results show, that by using a polyisocyanate mixture according to the invention, a coating can be formulated at similar viscosity during application and similar end performance, but significantly lower content of organic solvents, as compared to the prior art.

The invention claimed is:
1. Polyisocyanate mixture comprising at least one polyisocyanurate which is based on tolylene diisocyanate and has isocyanate groups and at least one polyurethane which is based on tolylene diisocyanate and has isocyanate groups, wherein the polyisocyanate mixture has
   a) a solids content of from ≥51 to ≤90% by weight, based on the total weight of the polyisocyanate mixture,
   b) a content of monomeric tolylene diisocyanate of ≤0.9% by weight, based on the total weight of the polyisocyanate mixture, and
   the polyisocyanurate which is based on tolylene diisocyanate and has isocyanate groups has a polydispersity D of from ≤1 to ≤1.5, based on the total weight of the polyisocyanurate which is based on tolylene diisocyanate and has isocyanate groups, where the polydispersity D is the ratio of weight average and number average molecular weight of the polyisocyanurate and the weight average and number average molecular weight is in each case determined by means of gel permeation chromatography using a polystyrene standard and tetrahydrofuran as eluent in accordance with DIN 55672-1:2016-03.

2. Polyisocyanate mixture according to claim 1, wherein the solids content is from ≥55 to ≤85% by weight.

3. Polyisocyanate mixture according to claim 1, wherein the polyisocyanurate which is based on tolylene diisocyanate and has isocyanate groups has a polydispersity D of from ≥1.0005 to ≤1.3.

4. Polyisocyanate mixture according to claim 1, wherein the content of monomeric tolylene diisocyanate is ≤0.5% by weight.

5. Polyisocyanate mixture according to claim 1, wherein the polyisocyanurate which is based on tolylene diisocyanate and has isocyanate groups and the polyurethane which is based on tolylene diisocyanate and has isocyanate groups are present in a weight ratio to one another of from 2.5:1 to 1:2.5.

6. Polyisocyanate mixture according to claim 1, wherein the polyisocyanate mixture has a viscosity of from ≥300 to <2000 mPas at 23° C., measured in accordance with DIN EN ISO 3219: 1994-10 using a cone/plate measuring instrument.

7. Polyisocyanate mixture according to claim 1, wherein the polyisocyanate mixture has a content of isocyanate groups of from 11.0 to ≤20.0% by weight, based on the total weight of the polyisocyanate mixture.

8. Polyisocyanate mixture according to an claim 1, wherein the polyisocyanurate which is based on tolylene diisocyanate and has isocyanate groups has a content of allophanate and urethane groups of from ≥0 to ≤0.5% by weight, based on the total weight of the polyisocyanurate.

9. Polyisocyanate mixture according to claim 1, wherein the solids content is from ≥60 to ≤80% by weight.

10. Polyisocyanate mixture according to claim 1, wherein the solids content is from ≥65 to ≤75% by weight.

11. Polyisocyanate mixture according to claim 1, wherein the polyisocyanurate which is based on tolylene diisocyanate and has isocyanate groups has a polydispersity D of from ≥1.005 to ≤1.15.

12. Polyisocyanate mixture according to claim 1, wherein the content of monomeric tolylene diisocyanate is ≤0.1% by weight.

13. Polyisocyanate mixture according to claim 1, wherein the polyisocyanurate which is based on tolylene diisocyanate and has isocyanate groups and the polyurethane which is based on tolylene diisocyanate and has isocyanate groups are present in a weight ratio to one another of from 2.0:1 to 1.1.5.

14. Polyisocyanate mixture according to claim 1, wherein the polyisocyanate mixture has a viscosity of from ≥500 to <1500 mPas at 23° C., measured in accordance with DIN EN ISO 3219:1 994-10 using a cone/plate measuring instrument.

15. Polyisocyanate mixture according to claim 1, wherein the polyisocyanate mixture has a content of isocyanate groups of from 12.0 to ≤18.0% by weight, based on the total weight of the polyisocyanate mixture.

16. Polyisocyanate mixture according to claim 1, wherein the polyisocyanate mixture has a content of isocyanate groups of from ≥14.0 to ≤16.0% by weight, based on the total weight of the polyisocyanate mixture.

17. Polyisocyanate mixture according to an claim 1, wherein the polyisocyanurate which is based on tolylene diisocyanate and has isocyanate groups has a content of allophanate and urethane groups of from ≥0% by weight to ≤0.1% by weight, based on the total weight of the polyisocyanurate.

18. Polyisocyanate mixture according to an claim 1, wherein the polyisocyanurate which is based on tolylene diisocyanate and has isocyanate groups has a content of allophanate and urethane groups of from ≥0 to ≤0.05% by weight, based on the total weight of the polyisocyanurate.

19. Process for preparing a polyisocyanate mixture according to claim 1, which comprises the steps
   (i) reaction of tolylene diisocyanate to form isocyanurate groups in the presence of at least one catalyst;
   (ii) stopping of the reaction at a content of isocyanate groups of from ≥30 to ≤48.3% by weight, by deactivation of the catalyst,
   (iii) removal of the unreacted tolylene diisocyanate,
   (iv) addition of at least one organic solvent which is inert to isocyanate groups and
   (v) addition of the at least one polyurethane which is based on tolylene diisocyanate and has isocyanate groups and is optionally diluted in at least one solvent and optionally further auxiliaries and additives,
   where the steps (iv) and (v) can be carried out in any order or simultaneously.

20. Process according to claim 19, wherein the steps (i) to (iii) are carried out in the presence of from ≥0 to <1% by weight, based on the total weight of the compounds used in step (i) and (ii), of liquid distillation auxiliaries which are inert under distillation conditions and have a boiling point at least 50° C. above that of the isocyanurate group-free monomeric isocyanate and/or from ≥0 to <1% by weight, based on the total weight of the compounds used in step (i) and (ii), of compounds which have one or more hydroxyl groups.

21. Two-component system comprising an isocyanate component A) containing at least one polyisocyanate mixture according to claim 1 and an NCO-reactive component B) containing at least one compound which is reactive towards isocyanate groups.

22. Process for producing a composite system or a coated substrate, which comprises a step in which a two-component system according to claim 21 is applied to at least one substrate and comprises at least one further step in which the two-component system applied to the substrate is cured, optionally under the action of heat.

23. Process according to claim 22, wherein the substrate comprises one or more materials selected from the group consisting of metal, plastic, glass, wood, leather, textiles and mixtures thereof.

24. Composite system or coated substrate which has been produced or can be produced by a process according to claim 22, wherein the composite system is a piece of furniture, a decorative object, a floor covering, a wooden interior installation or a shoe and the coated substrate is a piece of furniture, a decorative object, a floor covering or a wooden interior installation.

25. Process according to claim 22, wherein the substrate comprises one or more materials selected from the group consisting of a natural or synthetic fibrous material and mixtures thereof.

26. Process according to claim 22, wherein the substrate comprises one or more materials selected from the group consisting of paper, cork and wood.

* * * * *